US012770540B2

(12) United States Patent
Lee et al.

(10) Patent No.: US 12,770,540 B2
(45) Date of Patent: Oct. 20, 2026

(54) UNIT FOR DRIVING A DISPLAY, OPERATING METHOD THEREOF, AND DISPLAY DEVICE

(71) Applicant: SAMSUNG ELECTRONICS CO., LTD., Suwon-si (KR)

(72) Inventors: Choonghoon Lee, Suwon-si (KR); Minsung Kim, Suwon-si (KR); Seung-Hoon Baek, Suwon-si (KR); Dongyeol Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/188,129

(22) Filed: Apr. 24, 2025

(65) Prior Publication Data

US 2026/0004688 A1 Jan. 1, 2026

(30) Foreign Application Priority Data

Jul. 1, 2024 (KR) ........................ 10-2024-0086102

(51) Int. Cl.

*G09G 3/00* (2006.01)
*G09G 3/32* (2016.01)
*G09G 3/3266* (2016.01)

(52) U.S. Cl.

CPC ........... *G09G 3/006* (2013.01); *G09G 3/3266* (2013.01); *G09G 3/32* (2013.01); *G09G 2310/0289* (2013.01); *G09G 2330/08* (2013.01); *G09G 2330/12* (2013.01)

(58) Field of Classification Search

CPC ........ G09G 3/006; G09G 3/3266; G09G 3/32; G09G 2310/0289; G09G 2330/08; G09G 2330/12; G09G 3/20; G09G 2310/0267; G09G 2310/0291

See application file for complete search history.

(56) References Cited

U.S. PATENT DOCUMENTS 10,909,897 B2 2/2021 Lee et al.
11,114,000 B2 9/2021 Jung et al.
11,222,570 B2 1/2022 Cao
11,545,105 B2 1/2023 Koyama et al.
11,694,631 B2 7/2023 Youn et al.
2007/0079192 A1 * 4/2007 Kim .................... G09G 3/3266 714/726

(Continued)

FOREIGN PATENT DOCUMENTS

KR 10-1166814 B1 7/2012
KR 10-1205769 B1 11/2012
KR 10-2020-0051893 A 5/2020

*Primary Examiner* — Hong Zhou

(74) *Attorney, Agent, or Firm* — Morgan, Lewis & Bockius LLP

(57) ABSTRACT

A display driving unit includes a first gate driving buffer configured to supply a first gate signal to a gate line of a display panel, a second gate driving buffer configured to supply a second gate signal to the gate line, a first comparison circuit configured to generate a signal for controlling at least one of the first gate driving buffer and the second gate driving buffer based on an output signal of the second gate driving buffer, and a second comparison circuit configured to generate a signal for controlling at least one of the first gate driving buffer and the second gate driving buffer based on an output signal of the first gate driving buffer.

20 Claims, 12 Drawing Sheets

(56) References Cited

U.S. PATENT DOCUMENTS

| | | | | |
|---|---|---|---|---|
| 2017/0256216 | A1* | 9/2017 | Cao | G09G 3/36 |
| 2018/0315369 | A1* | 11/2018 | Pyun | G09G 3/3677 |
| 2019/0362661 | A1* | 11/2019 | Saito | G09G 3/006 |
| 2024/0194138 | A1* | 6/2024 | Kim | G09G 3/3233 |

* cited by examiner

UNIT FOR DRIVING A DISPLAY, OPERATING METHOD THEREOF, AND DISPLAY DEVICE

CROSS-REFERENCE TO RELATED APPLICATION

This patent application claims priority under 35 U.S.C. § 119 to Korean Patent Application No. 10-2024-0086102 filed on Jul. 1, 2024, in the Korean Intellectual Property Office, the disclosure of which is incorporated by reference in its entirety herein.

1. TECHNICAL FIELD

One or more embodiments are directed to a unit for driving a display, an operating method thereof, and a display device.

2. DISCUSSION OF RELATED ART

Virtual reality (VR) devices create fully immersive environments that replace the real world. They are commonly used in gaming, training simulations, virtual tours, and certain therapy applications. These devices typically include head-mounted displays with sensors for motion tracking, allowing users to explore a 360-degree environment.

Augmented reality (AR) displays like AR glasses layer digital information on top of the real world, enhancing the user's perception of their environment. They are useful in applications like navigation, education, maintenance, and retail. AR displays rely on cameras, sensors, and software to integrate digital elements seamlessly with the physical surroundings.

VR devices and AR display require a high-resolution display device such as a micro display device. Examples of the micro display device include an organic light-emitting diode on silicon (OLEDoS) display device and a light-emitting diode on silicon (LEDoS)) display device. The display device includes a display panel and a driving unit for driving the display panel. The driving unit may include a gate driving unit for activating gate lines of the display panel, and a data driving unit (or a source driver) for providing data signals to data lines of the display panel. However, an abnormality may occur in the driving unit that reduces the quality of image presented by the display panel.

SUMMARY

At least one embodiment provides a method for detecting an abnormality occurring in a unit for driving a display panel.

At least one embodiment provides a method capable of stably driving a display panel.

According to an embodiment, a display driving unit includes a first gate driving buffer, a second gate driving buffer, a first comparison circuit and a second comparison circuit. The first gate driving buffer is configured to supply a first gate signal to a gate line of a display panel. The second gate driving buffer is configured to supply a second gate signal to the gate line. The first comparison circuit is configured to generate a signal for controlling at least one of the first gate driving buffer and the second gate driving buffer based on an output signal of the second gate driving buffer. The second comparison circuit is configured to generate a signal for controlling at least one of the first gate driving buffer and the second gate driving buffer based on an output signal of the first gate driving buffer.

The first gate driving buffer may include a first gate driving logic configured to output a driving signal for activating the gate line. The first gate driving buffer may include a first level shifter configured to increase a level of an output signal of the first gate driving logic.

The second gate driving buffer may include a second gate driving logic configured to output a driving signal for activating the gate line. The second gate driving buffer may include a second level shifter configured to increase a level of an output signal of the second gate driving logic.

The first gate driving buffer may further include a first switch for coupling the first level shifter to a first end of the gate line.

The second gate driving buffer may further include a second switch for coupling the second level shifter to a second end of the gate line.

The display driving unit may further include a first internal buffer configured to decrease a level of the output signal of the second gate driving buffer. The display driving unit may further include a second internal buffer configured to decrease a level of the output signal of the first gate driving buffer.

Each of the first internal buffer and the second internal buffer may include at least one inverter connected in series.

The first comparison circuit may be configured to compare the output signal of the first gate driving logic and an output signal of the first internal buffer while the gate line is activated by the second gate driving buffer.

The second comparison circuit may be configured to compare the output signal of the second gate driving logic and an output signal of the second internal buffer while the gate line is activated by the first gate driving buffer.

The first comparison circuit may be configured to compare an output signal level of the first gate driving logic and an output signal level of the first internal buffer.

The display driving unit may further include a controller configured to control at least one of the first switch and the second switch based on at least one of an output signal of the first comparison circuit and an output signal of the second comparison circuit.

According to an embodiment, a method of driving a display includes supplying a gate signal to a gate line of a display panel through at least one of a first gate driving buffer and a second gate driving buffe; generating a first signal for controlling at least one of the first gate driving buffer and the second gate driving buffer based on an output signal of the second gate driving buffer supplied to the gate line, through a first comparison circuit; and generating a second signal for controlling at least one of the first gate driving buffer and the second gate driving buffer based on an output signal of the first gate driving buffer supplied to the gate line, through a second comparison circuit.

The generating of the first signal may include generating a level adjusted signal by adjusting a level of the output signal of the second gate driving buffer while the gate line is activated by the second gate driving buffer among the first gate driving buffer and the second gate driving buffer. The generating of the first signal may include comparing the level adjusted signal and an output signal of a gate driving logic of the first gate driving buffer while the gate line is activated by the second gate driving buffer.

According to an embodiment, a display device includes a display panel including a pixel array having pixels, and a gate line for providing a voltage to a row of the pixels. The display device includes a first gate driving buffer, a second gate driving buffer, a first comparison circuit and a second comparison circuit. The first gate driving buffer is configured to supply a first gate signal to the gate line of the display panel. The second gate driving buffer is configured to supply a second gate signal to the gate line. The first comparison circuit is configured to generate a signal for controlling at least one of the first gate driving buffer and the second gate driving buffer based on an output signal of the second gate driving buffer. The second comparison circuit is configured to generate a signal for controlling at least one of the first gate driving buffer and the second gate driving buffer based on an output signal of the first gate driving buffer.

The first gate driving buffer may include first gate driving logic configured to output a driving signal for activating the gate line. The first gate driving buffer may include a first level shifter configured to increase a level of an output signal of the first gate driving logic.

The second gate driving buffer may include a second gate driving logic configured to output a driving signal for activating the gate line. The second gate driving buffer may include a second level shifter configured to increase a level of an output signal of the second gate driving logic.

The first gate driving buffer may further include a first switch for coupling the first level shifter to a first end of the gate line.

The second gate driving buffer may further include a second switch for coupling the second level shifter to a second end of the gate line.

The display device may further include a first internal buffer configured to decrease a level of the output signal of the second gate driving buffer. The display device may further include a second internal buffer configured to decrease a level of the output signal of the first gate driving buffer.

The first comparison circuit may be configured to compare the output signal of the first gate driving logic and an output signal of the first internal buffer while the gate line is activated by the second gate driving buffer.

The second comparison circuit may be configured to compare the output signal of the second gate driving logic and an output signal of the second internal buffer while the gate line is activated by the first gate driving buffer.

The first comparison circuit may be configured to compare an output signal level of the first gate driving logic and an output signal level of the first internal buffer.

The display device may further include a controller configured to control at least one of the first switch and the second switch based on at least one of an output signal of the first comparison circuit and an output signal of the second comparison circuit.

According to an embodiment, a display driving unit includes: a controller, a first gate driving buffer configured to supply a first gate signal to a gate line of a display panel, a second gate driving buffer configured to supply a second gate signal to the gate line, a first comparison circuit configured to supply a first signal to the controller when a comparison of a first output signal of the second gate driving buffer and a first reference signal from the first gate driving buffer indicates the second gate driving buffer is in an abnormal state, a second comparison circuit configured to supply a second signal to the controller when a comparison of a second output signal of the first gate driving buffer and a second reference signal from the second gate driving buffer indicates the first gate driving buffer is in the abnormal state. The controller disconnects the second gate driving buffer from the gate line upon receiving the first signal. The controller disconnects the first gate driving buffer from the gate line upon receiving the second signal.

BRIEF DESCRIPTION OF THE DRAWINGS

These and/or other aspects and features of the inventive concept will become apparent and more readily appreciated from the following description of example embodiments, taken in conjunction with the accompanying drawings of which.

DETAILED DESCRIPTION

Figure 1:
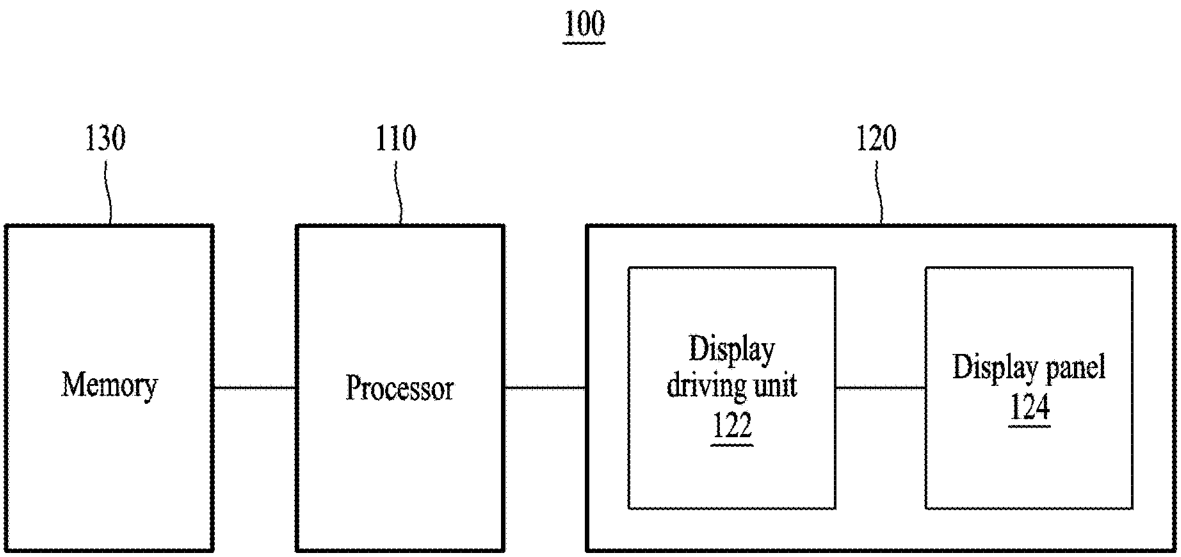
FIG. 1 is a schematic block diagram of an electronic device according to an embodiment.

Hereinafter, example embodiments of the inventive concept will be described in detail with reference to the accompanying drawings. When describing the examples with reference to the accompanying drawings, like reference numerals refer to like elements and a repeated description related thereto will be omitted.

FIG. 1 is a schematic block diagram of an electronic device according to an embodiment.

Referring to FIG. 1, according to an embodiment, an electronic device 100 (e.g., an augmented reality (AR) device, a virtual reality (VR) device, a mixed reality (MR) device, an extended reality (XR) device, a head-up display (HUD) device, or a wearable device) may include a processor 110, a memory 130, and a display device 120.

The processor 110 may execute software (e.g., a program or an application) to control at least one other component (e.g., a hardware or software component) of the electronic device connected to the processor 110. The processor 110 may execute software to perform various data processing or computation. As at least a portion of data processing or computation, the processor 110 may store a command or data received from another component (e.g., a sensor module or a communication module) of the electronic device 100 in the memory 130, process the command or the data stored in the memory 130, and store resulting data in the memory 130. The processor 110 may include a main processor (e.g., a central processing unit (GPU) or an application processor (AP)). The processor 110 may include an auxiliary processor (e.g., a graphics processing unit (GPU), a neural processing unit (NPU), an image signal processor (ISP), a sensor hub processor, or a communication processor (CP)) that is operable independently of, or in conjunction with the main processor. For example, when the electronic device 100 includes the main processor and the auxiliary processor, the auxiliary processor may be adapted to consume less power than the main processor or to be specific to a specified function. The auxiliary processor may be implemented separately from the main processor or as a part of the main processor.

The auxiliary processor may control at least some functions or states related to at least one (e.g., a display driving unit 122, a sensor module, or a communication module) of the components of the electronic device 100, instead of the main processor while the main processor is in an inactive (e.g., sleep) state or along with the main processor while the main processor is in an active state (e.g., executing an application). The auxiliary processor (e.g., an ISP or a CP) may be implemented as a portion of another component (e.g., a camera module or a communication module) that is functionally related to the auxiliary processor. The auxiliary processor (e.g., an NPU) may include a hardware structure specific for artificial intelligence model processing. An artificial intelligence model may be trained through a learning process. This training may be performed by, for example, by the electronic device 100, which executes the artificial intelligence, or by a separate server. The learning process may include supervised learning, unsupervised learning, semi-supervised learning, or reinforcement learning, but is not limited thereto. The artificial intelligence model may be an artificial neural network including a plurality of artificial neural network layers. The artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence network may be implemented in hardware, software or a combination of hardware and software.

The processor 110 may generate image data to be output through a display panel 124, and provide the image data to the display driving unit 122 (e.g., a data driving unit). The processor 110 may control at least one component of the display device 120. For example, the processor 110 may directly generate a signal (e.g., a timing control signal) for controlling the display driving unit 122. In another example, the processor 110 may indirectly control the display driving unit 122 through a controller (e.g., a controller 240 of FIG. 2).

The memory 130 may store various pieces of data used by at least one component (e.g., the processor 110) of the electronic device 100. The data may include input data or output data for software (e.g., a program or an application) and commands related to the software. The memory 130 may include a volatile memory and/or a non-volatile memory. Instructions stored in the memory 130 may be executed individually or collectively by at least one processor (e.g., a main processor and/or an auxiliary processor) to cause the electronic device 100 to perform one or more operations. For example, the instructions stored in the memory 130 may be executed by one processor (e.g., a main processor or an auxiliary processor) or may be executed by a plurality of processors (e.g., a main processor and an auxiliary processor) operating cooperatively.

The display device 120 (e.g., a micro display device such as an organic light-emitting diode on silicon (OLEDoS) or a light-emitting diode on silicon (LEDoS)) may include the display driving unit 122 (or a display driving circuit) and the display panel 124.

The display driving unit 122 may include a gate driving unit (or a gate driver) and a data driving unit (or a source driver). The gate driving unit may supply (or provide) a gate signal to a gate line of the display panel 124. The data driving unit may generate a data signal, and supply (or provide) the data signal to a data line of the display panel 124.

Figure 2:
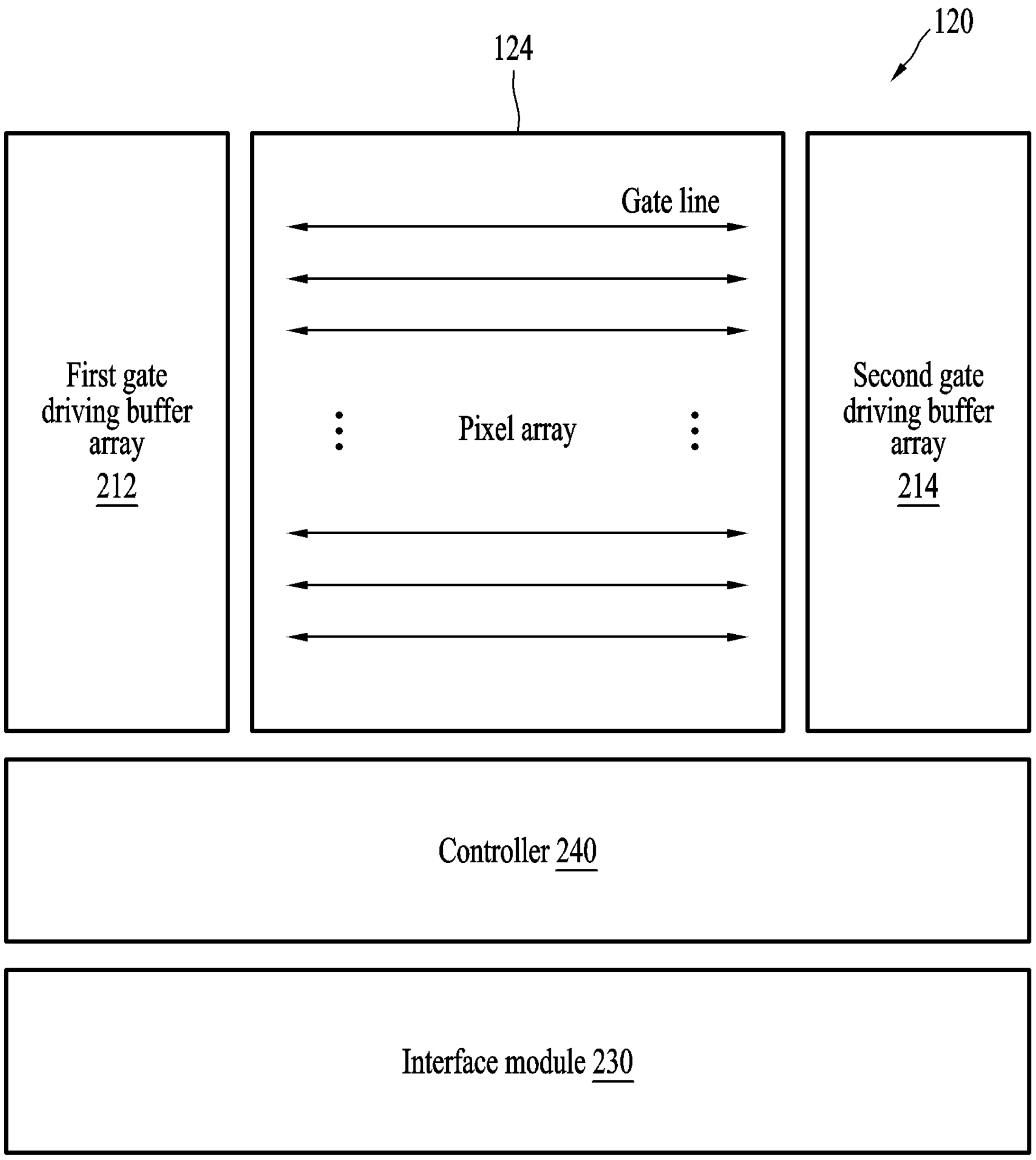
FIG. 2 is a schematic block diagram of a display device according to an embodiment.

FIG. 2 is a schematic block diagram of a display device according to an embodiment.

Referring to FIG. 2, according to an embodiment, the display device 120 includes the display panel 124, a first gate driving buffer array 212, a second gate driving buffer array 214, an interface module 230, and the controller 240. The first gate driving buffer array 212, the second gate driving buffer array 214, the interface module 230, and the controller 240 may be components of a display driving unit (e.g., the display driving unit 122 of FIG. 1).

The display panel 124 may include a pixel array, a plurality of gate lines, and a plurality of data lines. The display panel 124 may display an image through the pixel array based on respective signals (e.g., gate signals or data signals) supplied to the plurality of gate lines and the plurality of data lines.

Each of the first gate driving buffer array 212 and the second gate driving buffer array 214 may supply gate signals to the plurality of gate lines of the display panel 124. The first gate driving buffer array 212 and the second gate driving buffer array 214 will be described in detail with reference to FIGS. 3 to 6.

The interface module 230 may be a hardware component for communication between the display device 120 and another component (e.g., the processor 110 of FIG. 1) of an electronic device (e.g., the electronic device 100 of FIG. 1). For example, a display driving unit (e.g., the display driving unit 122 of FIG. 1) may receive image data and/or a timing control signal from the processor 110 via the interface module 230. The interface module 230 may be based on an interface of various specifications (e.g., a mobile display digital interface (MDDI)).

The controller 240 may control at least one component of the display device 120. For example, the controller 240 may control a switch (e.g., a first switch 432 or a second switch 434 of FIGS. 4 to 6) of a gate driving buffer based on an output signal of a comparison circuit (e.g., a first comparison circuit 442 or a second comparison circuit 444 of FIGS. 4 to 6) for confirming or determining a state of the gate driving buffer (e.g., a first gate driving buffer 310 or a second gate driving buffer 320 of FIGS. 3 to 6). The controller 240 may provide a source signal to a gate driving logic (e.g., a first gate driving logic 412 or a second gate driving logic 414 of FIGS. 4 to 6). The controller 240 may be implemented by a processor.

Figure 3:
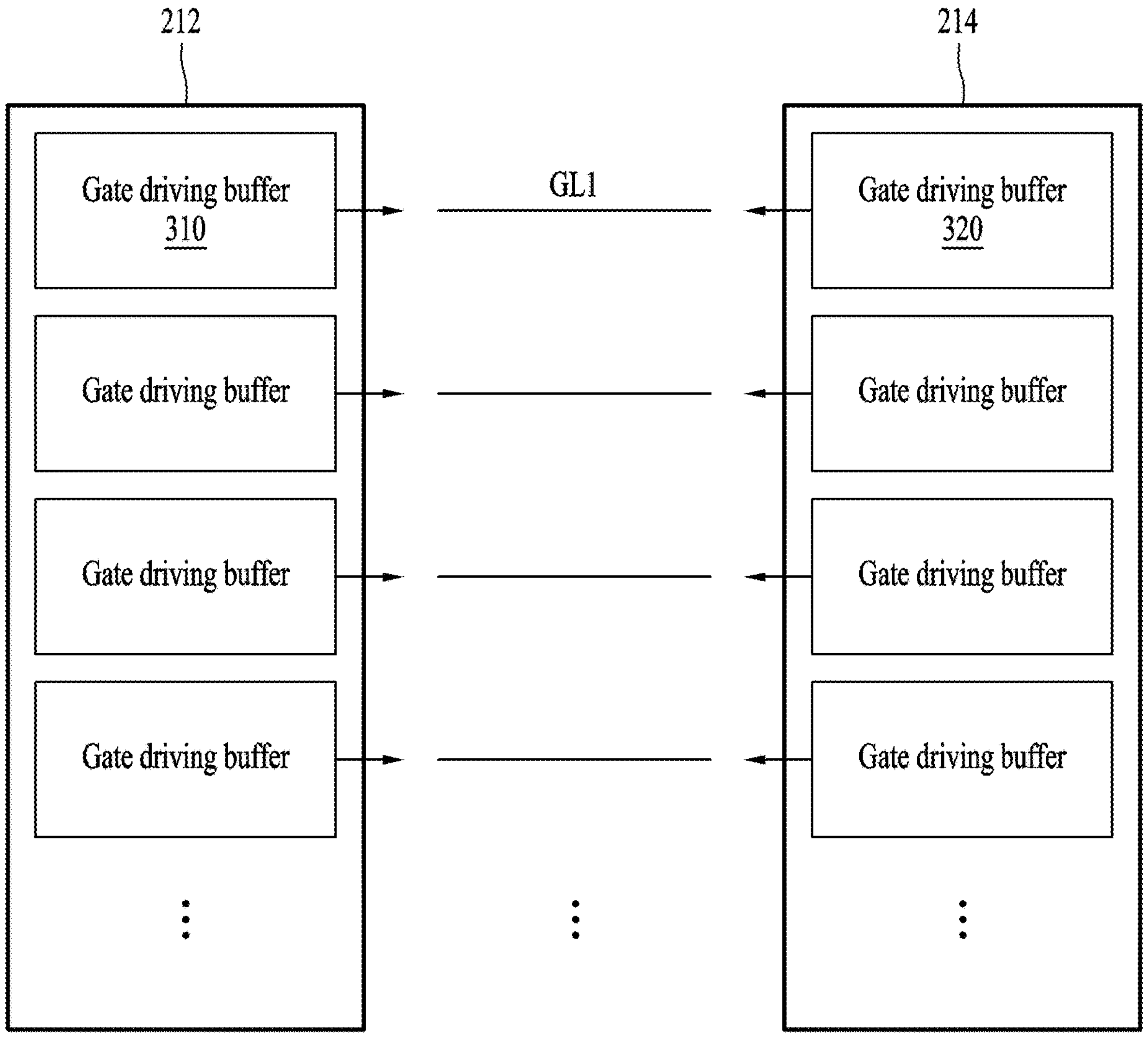
FIG. 3 is a diagram illustrating a gate driving buffer array according to an embodiment.

FIG. 3 is a diagram illustrating a gate driving buffer array according to an embodiment.

Referring to FIG. 3, according to an embodiment, each of the first gate driving buffer array 212 and the second gate driving buffer array 214 may include a plurality of gate driving buffers. Each of the first gate driving buffer array 212 and the second gate driving buffer array 214 may further include at least one additional component. For example, each of the first gate driving buffer array 212 and the second gate driving buffer array 214 may include a comparison circuit (e.g., the first comparison circuit 442 or the second comparison circuit 444 of FIGS. 4 to 6) and/or an internal buffer (e.g., a first internal buffer 452 or a second internal buffer 454 of FIGS. 4 to 6).

Each (e.g., the first gate driving buffer 310) of the plurality of gate driving buffers of the first gate driving buffer array 212 may output a gate signal to a first end of a corresponding gate line (e.g., a gate line GL1).

Each (e.g., the second gate driving buffer 320) of the plurality of gate driving buffers of the second gate driving buffer array 214 may output a gate signal to a second end of a corresponding gate line (e.g., the gate line GL1). The first and second ends may be located on opposite ends of a gate line.

Hereinafter, for convenience of description, the present disclosure will be described based on one gate line (e.g., the gate line GL1) and two gate driving buffers (e.g., the first gate driving buffer 310 and the second gate driving buffer 320) that supply (or provide) a gate signal to the one gate line. The technical idea of the present disclosure related to one of the plurality of gate lines to be described below may be equally applied to other gate lines and components related to the other gate lines.

Figure 4:
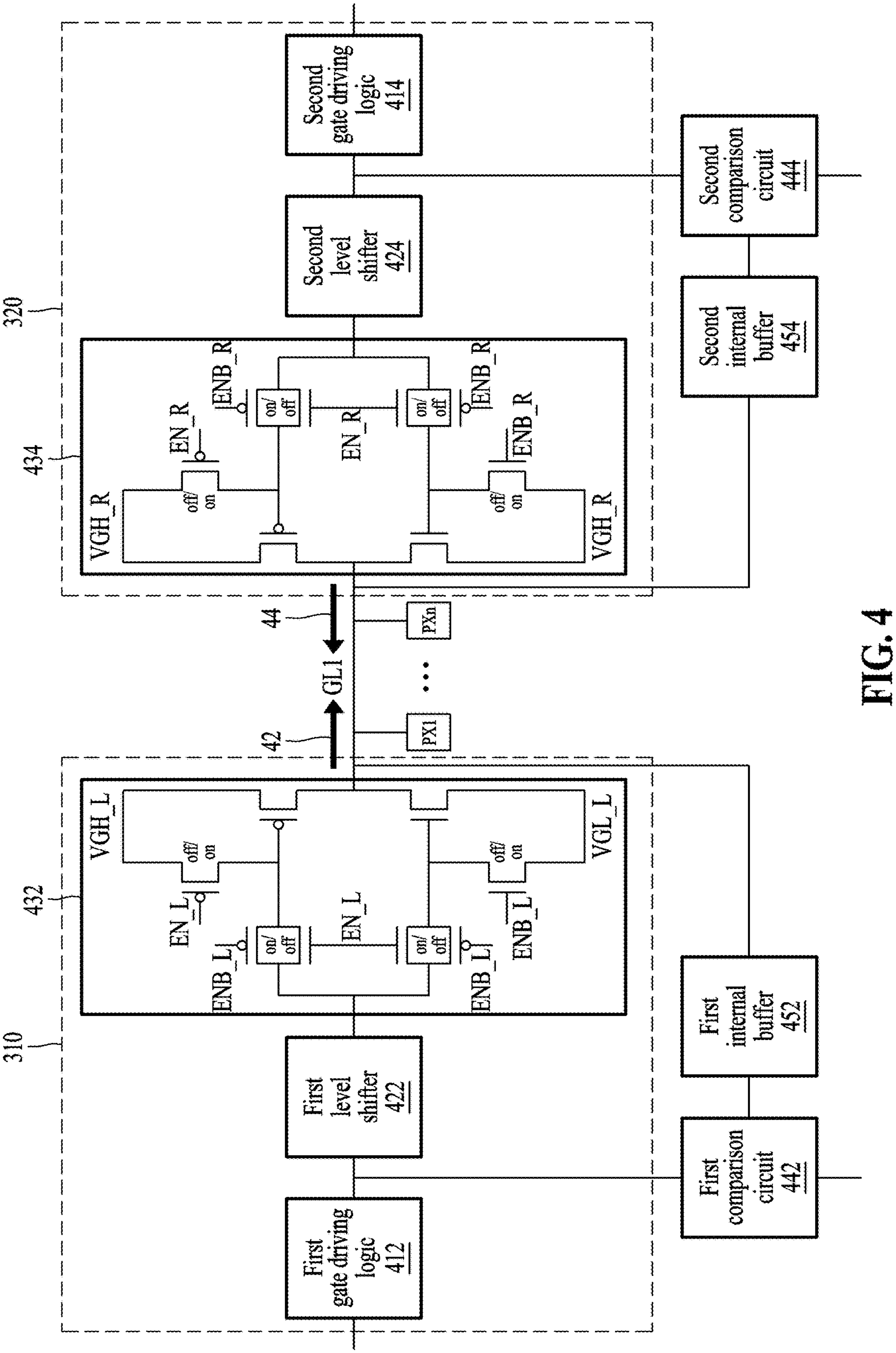
FIG. 4 is a diagram illustrating a gate signal output from a gate driving buffer according to an embodiment.

FIG. 4 is a diagram illustrating a gate signal output from a gate driving buffer according to an embodiment.

Referring to FIG. 4, according to an embodiment, the first gate driving buffer 310 includes first gate driving logic 412, a first level shifter 422, and a first switch 432 (e.g., a first switching circuit). A first gate driving buffer array (e.g., the first gate driving buffer array 212 of FIGS. 2 and 3) may include the first comparison circuit 442 and the first internal buffer 452 corresponding to the first gate driving buffer 310. The first level shifter 422 may convert a signal from one voltage level to another.

The second gate driving buffer 320 includes the second gate driving logic 414, a second level shifter 424, and a second switch 434 (e.g., a second switching circuit). A second gate driving buffer array (e.g., the second gate driving buffer array 214 of FIGS. 2 and 3) includes the second comparison circuit 444 and the second internal buffer 454 corresponding to the second gate driving buffer 320.

Although FIG. 4 shows that the first gate driving buffer 310 and the second gate driving buffer 320 supply a gate signal (e.g., a first gate signal 42 or a second gate signal 44) to one gate line GL1, the inventive concept is not limited thereto. For example, each of the first gate driving buffer 310 and the second gate driving buffer 320 may supply multiple gate signals (e.g., an emission signal, an initialization signal, or a scan signal) to pixels PX1 to PXn ("n" is a natural number) through a corresponding gate line among the plurality of gate lines.

The first gate driving logic 412 may output a driving signal to activate the gate line GL1. The first gate driving logic 412 may receive a source signal from a controller (e.g., the controller 240 of FIG. 2) to generate a driving signal. The first gate driving logic 412 may be implemented by a processor (e.g., a microprocessor).

The first level shifter 422 may adjust a level (e.g., a voltage level) of an output signal of the first gate driving logic 412 to generate the first gate signal 42. For example, the first level shifter 422 may increase the level of the output signal of the first gate driving logic 412. The first level shifter 422 may be implemented using at least one transistor (e.g., an n-channel metal-oxide-semiconductor (NMOS) and/or a p-channel metal-oxide-semiconductor (PMOS)).

The first switch 432 may couple the first level shifter 422 to the first end of the gate line GL1. The first switch 432 may include at least one transistor (e.g., an NMOS and/or a PMOS). The structure of the first switch 432 shown in FIG. 4 is an example for description, and various modifications thereof also fall within the scope of the present disclosure. "EN" and "ENB" may represent control signals (or enable signals), "VGH" may represent a high gate voltage, and "VGL" may represent a low gate voltage that is less than the high gate voltage.

The first comparison circuit 442 and the first internal buffer 452 may be components to confirm or determine a state of the second gate driving buffer 320 and/or a state of the gate line GL1. The first comparison circuit 442 and the first internal buffer 452 will be described in detail with reference to FIGS. 5 and 6.

The second gate driving logic 414 may output a driving signal to activate the gate line GL1. The second gate driving logic 414 may receive a source signal from the controller 240 to generate the driving signal. The second gate driving logic 414 may be implemented by a processor (e.g., a microprocessor).

The second level shifter 424 may adjust a level (e.g., a voltage level) of an output signal of the second gate driving logic 414 to generate the second gate signal 44. For example, the second level shifter 424 may increase the level of the output signal of the second gate driving logic 414. The second level shifter 424 may be implemented using at least one transistor (e.g., an NMOS and/or a PMOS).

The second switch 434 may couple the second level shifter 424 to the second end of the gate line GL1. The second switch 434 may include at least one transistor (e.g., an NMOS and/or a PMOS). The structure of the second switch 434 shown in FIG. 4 is an example for description, and various modifications thereof also fall within the scope of the present disclosure.

The second comparison circuit 444 and the second internal buffer 454 may be components to confirm or determine a state of the second gate driving buffer 320 and/or a state of the gate line GL1. The second comparison circuit 444 and the second internal buffer 454 will be described in detail with reference to FIGS. 5 and 6.

The first gate driving buffer 310 may supply (output) the first gate signal 42 to the gate line GL1 alone or together with the second gate signal 44 of the second gate driving buffer 320. Similarly, the second gate driving buffer 320 may supply the second gate signal 44 to the gate line GL1 alone or together with the first gate signal 42 of the first gate driving buffer 310.

Figure 5:
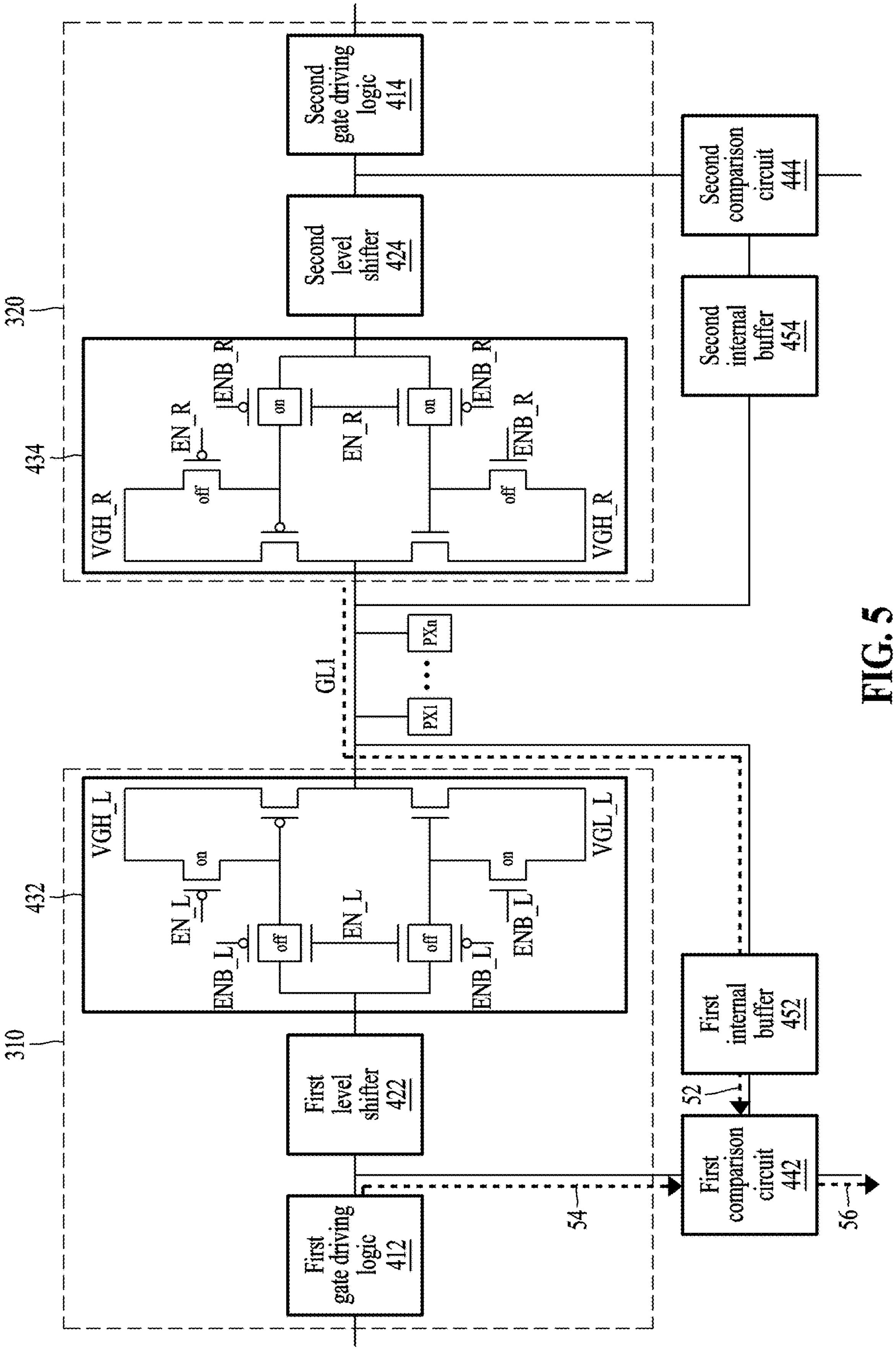
FIGS. 5 and 6 are diagrams illustrating operations of a display driving unit according to an embodiment.
Figure 6:
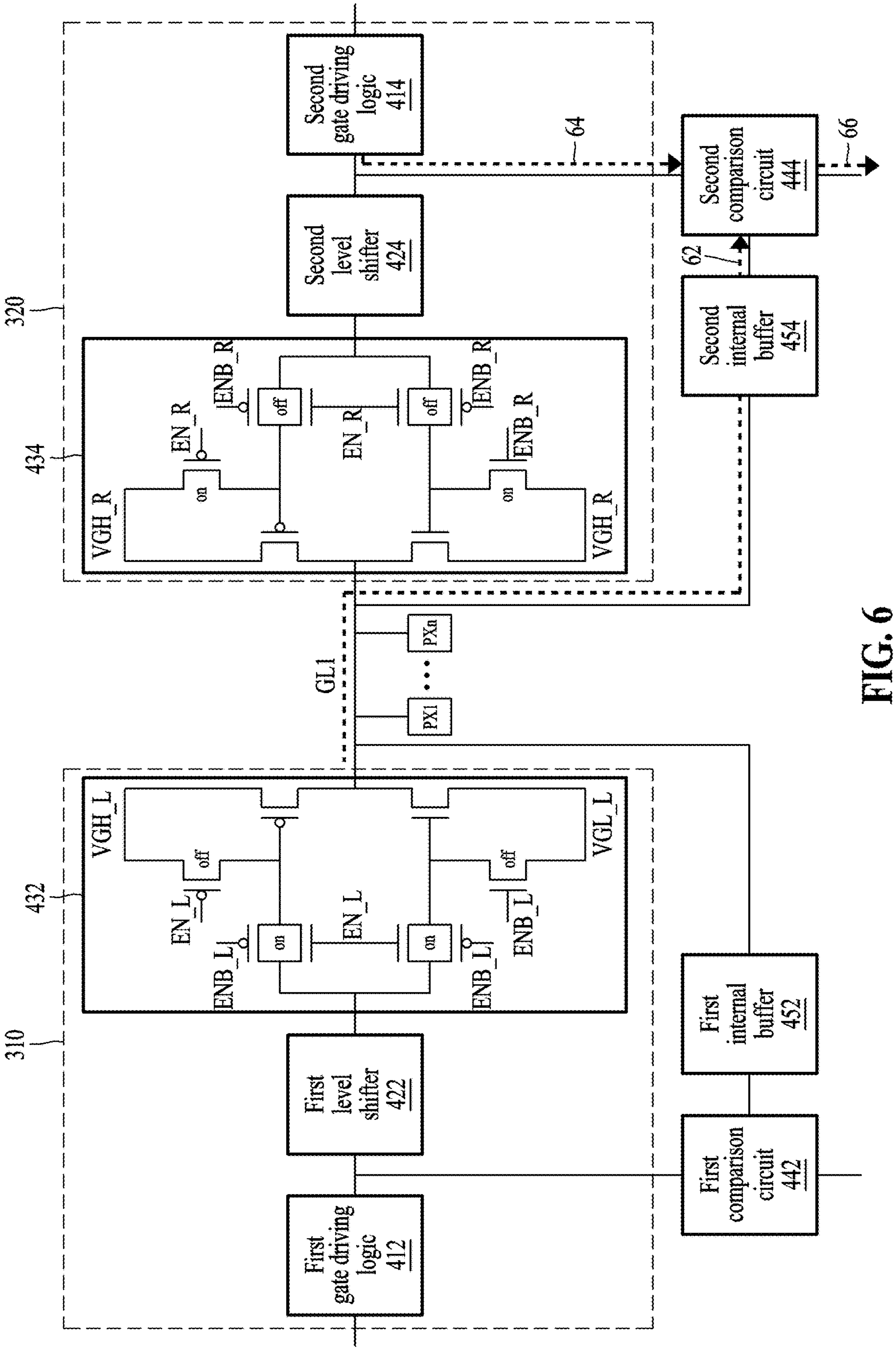

FIGS. 5 and 6 are diagrams illustrating operations of a display driving unit according to an embodiment. FIG. 5 is a diagram illustrating an operation of a display driving unit (e.g., the display driving unit 122) when the second gate driving buffer 320 outputs a gate signal to the gate line GL1 in a test mode. FIG. 6 is a diagram illustrating an operation of the display driving unit when the first gate driving buffer 310 outputs a gate signal to the gate line GL1 in the test mode.

Referring to FIG. 5, according to an embodiment, while the second gate driving buffer 320 outputs a gate signal to the gate line GL1, the first comparison circuit 442 generates an output signal 56 (e.g., a binary signal such as "0" or "1") based on two input signals 52 and 54. The first input signal 52 of the first comparison circuit 442 may be a signal generated based on an output signal of the second gate driving buffer 320. In an embodiment, the first internal buffer 452 decreases a level of the output signal of the second gate driving buffer 320 to generate the first input signal 52. The second input signal 54 of the first comparison circuit 442 may be an output signal of the first gate driving logic 412. The second input signal 54 may be referred to as a first reference signal.

In an embodiment, the first comparison circuit 442 generates the output signal 56 based on a level difference between the first input signal 52 and the second input signal 54. The operation of the first comparison circuit 442 will be described in detail with reference to FIGS. 7A to 7C. At least one of the first gate driving buffer 310 and the second gate driving buffer 320 may be controlled based on the output signal 56 of the first comparison circuit 442. For example, the first comparison circuit 442 may provide the output signal 56 indicating that there is an abnormality in the second gate driving buffer 320 to a controller (e.g., the controller 240 of FIG. 2). In an embodiment, the controller turns on the first switch 432 or maintains the first switch 432 in a turned on state, and turns off the second switch 434 when the output signal 56 of the first comparison circuit 442 indicates an abnormality in the second gate driving buffer 320. The turn on of the first switch 432 may result in the first gate driving buffer 310 being connected to the gate line GL1 and the turn off of the second switch 434 may result in the seconds gate driving buffer 320 being disconnected from the gate line GL1.

Referring to FIG. 6, according to an embodiment, while the first gate driving buffer 310 outputs a gate signal to the gate line GL1, the second comparison circuit 444 generates an output signal 66 based on two input signals 62 and 64. The first input signal 62 of the second comparison circuit 444 may be a signal generated based on the output signal of the first gate driving buffer 310. In an embodiment, the second internal buffer 454 decreases a level of the output signal of the second gate driving buffer 320 to generate the first input signal 62. The second input signal 64 of the second comparison circuit 444 may be an output signal of the second gate driving logic 414. The second input signal 64 may referred to as a second reference signal.

In an embodiment, the second comparison circuit 444 generates the output signal 66 based on a level difference between the first input signal 62 and the second input signal 64. The operation of the second comparison circuit 444 will be described in detail with reference to FIG. 7A, FIG. 7B, and FIG. 7C.

At least one of the first gate driving buffer 310 and the second gate driving buffer 320 may be controlled based on the output signal 66 of the second comparison circuit 444. In an embodiment, the second comparison circuit 444 provides the output signal 66 indicating that there is an abnormality in the first gate driving buffer 310 to a controller (e.g., the controller 240 of FIG. 2), and the controller turns off the first switch 432, and turns on the second switch 434 or maintains the second switch 434 in a turned on state when the output signal 66 of the second comparison circuit 444 indicates there is an abnormality in the first gate driving buffer 310. For example, the turn off of the first switch 432 may result in the first gate driving buffer 310 being disconnected from the gate line GL1 and the turn on of the second switch 434 may result in the second gate driving buffer 320 being connected to the gate line GL1.

When there is an abnormality in one of the two gate driving buffers (e.g., the first gate driving buffer 310 and the second gate driving buffer 320) that supply a gate signal to a gate line (e.g., the gate line GL1), the display driving unit 122 may detect the abnormality using a comparison circuit, and supply the gate signal to the gate line using a gate driving buffer that is in a normal state and not the gate driving buffer in which the abnormality is detected.

Figure 7A:
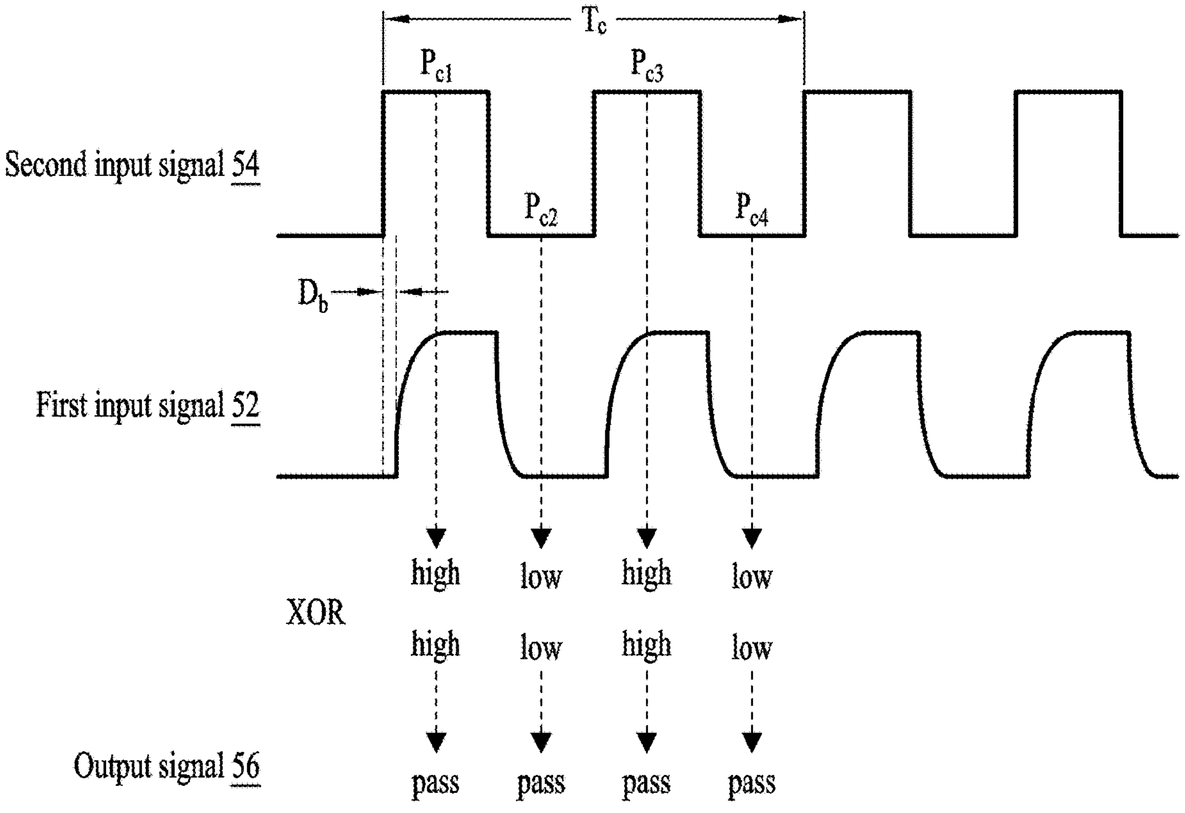
FIGS. 7A to 7C are diagrams illustrating operations of a comparison circuit.
Figure 7B:
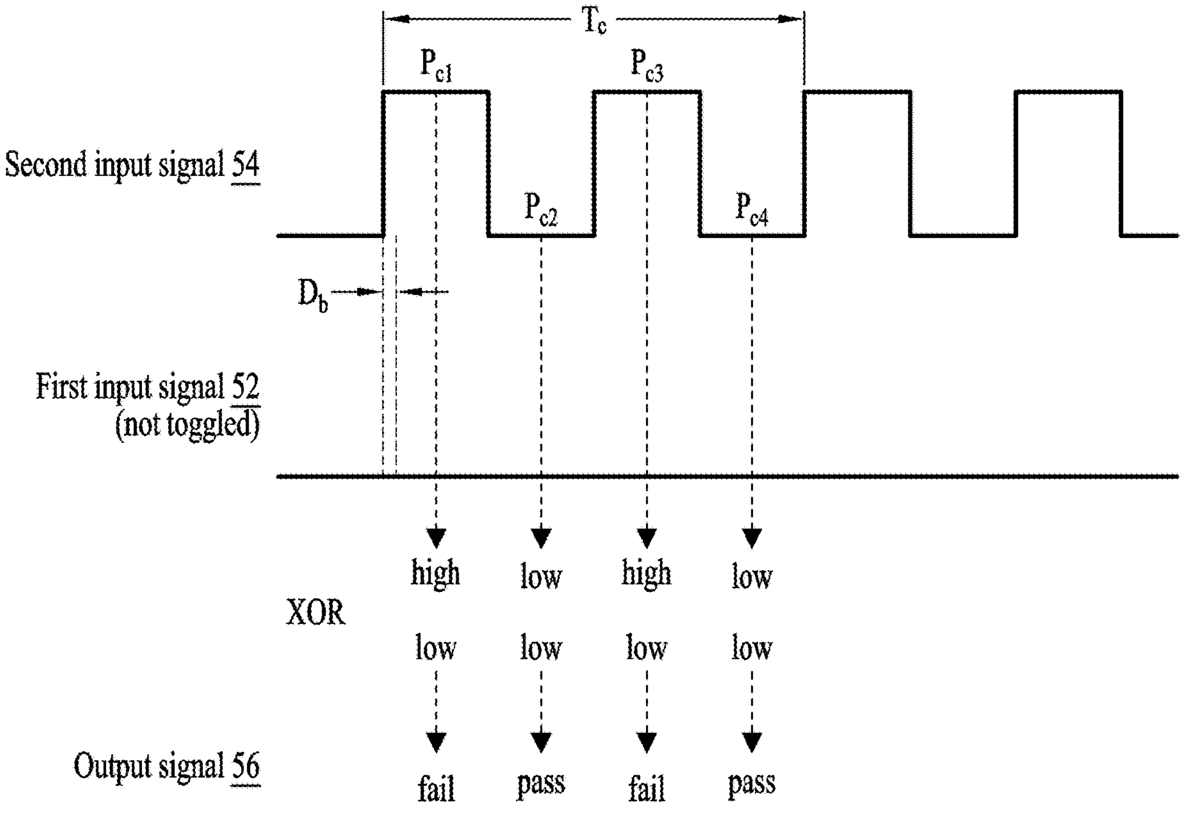
Figure 7C:
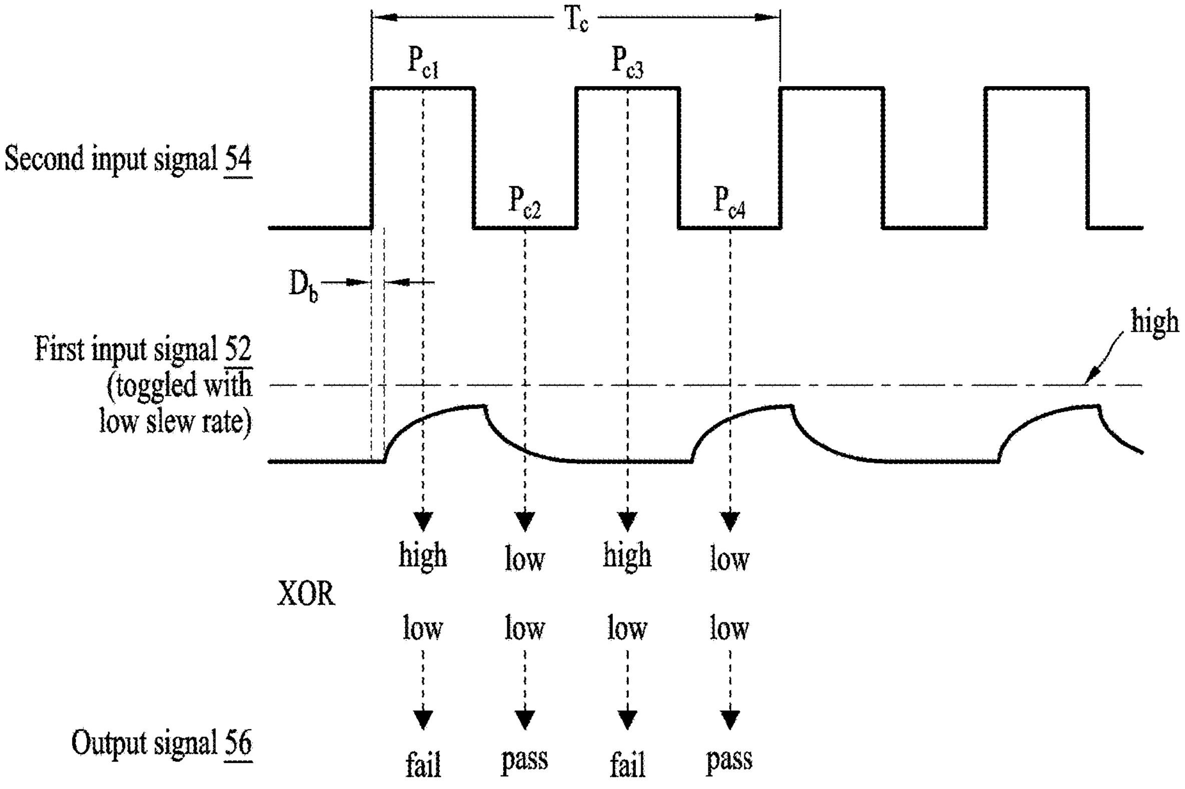

FIGS. 7A to 7C are diagrams illustrating operations of a comparison circuit. FIGS. 7A to 7C show input signals and an output signal to describe the operation of a first comparison circuit (e.g., the first comparison circuit 442 of FIG. 5). The operation of a second comparison circuit (e.g., the second comparison circuit 444 of FIG. 6) may be substantially the same as the operation of the first comparison circuit 442, and therefore, a repeated description is omitted. In an embodiment, the second comparison circuit 444 compares a level of the first input signal 62 to a level of the second input signal 64 while the gate line GL1 is activated by the first gate driving buffer 310.

FIG. 7A may be a diagram illustrating an operation of the first comparison circuit 442 when an output of a second gate driving buffer (e.g., the second gate driving buffer 320 of FIG. 5) is normal. Referring to FIG. 7A, the first comparison circuit 442 may compare a level of the first input signal 52 to a level of the second input signal 54 during a time interval Tc. Settings related to the time interval Tc (e.g., a starting point or a time length) may be set by a user. In an embodiment, the first comparison circuit 442 compares a level of the first input signal 52 to a level of the second input signal 54 while the gate line GL1 is activated by the second gate driving buffer 320. For example, one or more pixels connected to the gate line GL1 may receive data when the gate line is activated. For example, the one or more pixels may be a row of the pixels.

A time delay $D_b$ due to the first internal buffer 452 may be present between the first input signal 52 and the second input signal 54. The first comparison circuit 442 may compare the level of the first input signal 52 to the level of the second input signal 54 n times (n is a "natural number") during a time interval $T_c$ by considering the time delay $D_b$. For example, the first comparison circuit 442 may compare the level of the first input signal 52 to the level of the second input signal 54 each time the level of the second input signal 54 changes.

The first comparison circuit 442 may compare the level of the first input signal 52 to the level of the second input signal 54 using a logical operation (e.g., exclusive OR (XOR)) to generate a comparison result, and generate the output signal 56 based on the comparison result. For example, the first comparison circuit 442 may output a signal (e.g., a binary signal of "0") indicating that the output of the second gate driving buffer 320 is normal when the level of the first input signal 52 is the same as the level of the second input signal 54. In another example, the first comparison circuit 442 may output a signal (e.g., a binary signal of "1") indicating that the output of the second gate driving buffer 320 is abnormal when the level of the first input signal 52 is different from the level of the second input signal 54. However, XOR is merely an example to describe the operation of the first comparison circuit 442, and the scope of the present disclosure is not limited thereto.

The output signal 56 of the first comparison circuit 442 may be transmitted to a controller (e.g., the controller 240 of FIG. 2). For example, the output signal 56 may be transmitted to the controller 240 through the first gate driving logic 412. In another example, the output signal 56 may be transmitted directly to the controller 240. The controller 240 may control switches (e.g., the first switch 432 and the second switch 434 of FIG. 5) based on the output signal 56. For example, when an output signal (e.g., a binary signal of "1") indicating that the output of the second gate driving buffer 320 is abnormal is generated more than a threshold number of times during the time interval $T_c$, the controller 240 may determine that there is an abnormality in the second gate driving buffer 320, and turn off the second switch 434.

When the output of the second gate driving buffer 320 is normal, a slew rate of the first input signal 52 may be a value within a normal range (e.g., a relatively large value). Since the slew rate of the first input signal 52 is within the normal range, the level of the first input signal 52 and the level of the second input signal 54 at each of comparison points $P_{c1}$ to $P_{c4}$ may be the same as each other.

FIG. 7B may be a diagram illustrating an operation of the first comparison circuit 442 when an output level of the second gate driving buffer 320 is abnormal. Referring to FIG. 7B, when the output level of the second gate driving buffer 320 is always "low" due to the abnormality in the second gate driving buffer 320 or the abnormality in the gate line GL1, the level of the first input signal 52 may be different from the level of the second input signal 54 in at least one of the comparison points $P_{c1}$ and $P_{c3}$. For example, in FIG. 7B, if the threshold were 1, then the second gate driving buffer 320 would be considered abnormal as soon as comparison point $P_{c1}$ occurred; but if the threshold were 2, then the second gate driving buffer 320 would not be considered abnormal until comparison point $P_{c3}$ occurs.

FIG. 7C may be a diagram illustrating an operation of the first comparison circuit 442 when a slew rate of the output of the second gate driving buffer 320 is abnormal. Referring to FIG. 7C, when the output of the second gate driving buffer 320 has a slew rate outside the normal range due to the abnormality in the second gate driving buffer 320, the output level of the second gate driving buffer 320 may not change from "low" to "high". Accordingly, the level of the first input signal 52 may be different from the level of the second input signal 54 in at least one of the comparison points $P_{c1}$ and $P_{c3}$.

Figure 8:
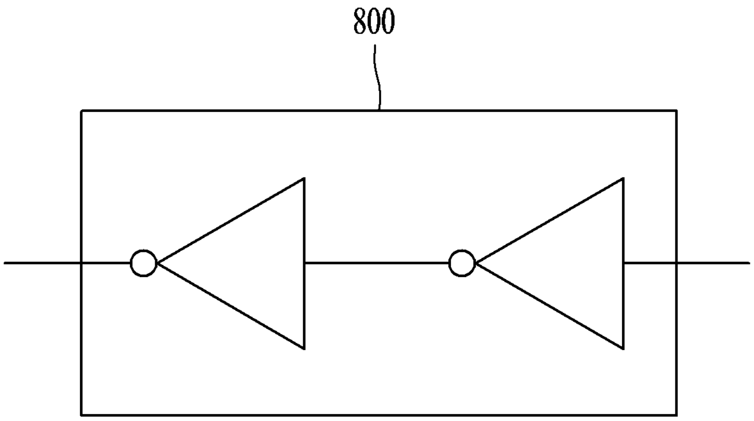
FIGS. 8 and 9 are diagrams illustrating an example of an internal buffer according to an embodiment.
Figure 9:
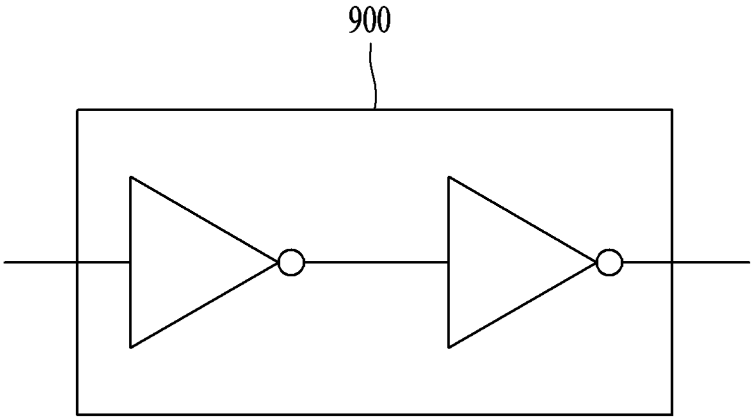

FIGS. 8 and 9 are diagrams illustrating an example of an internal buffer according to an embodiment.

Referring to FIGS. 8 and 9, according to an embodiment, an internal buffer 800 (e.g., the first internal buffer 452 of FIGS. 4 to 6) for lowering the level of an output signal of each of a plurality of gate driving buffers (e.g., the second gate driving buffer 320 of FIGS. 3 to 6) in a second gate driving buffer array (e.g., the second gate driving buffer array 214 of FIGS. 2 and 3) may include at least one inverter connected in series. For example, the internal buffer 800 may include two inverters connected in series.

An internal buffer 900 (e.g., the second internal buffer 454 of FIGS. 4 to 6) for lowering the level of an output signal of each of a plurality of gate driving buffers (e.g., the first gate driving buffer 310 of FIGS. 3 to 6) in a first gate driving buffer array (e.g., the first gate driving buffer array 212 of FIGS. 2 and 3) may include at least one inverter connected in series. For example, the internal buffer 900 may include two inverters connected in series.

Figure 10:
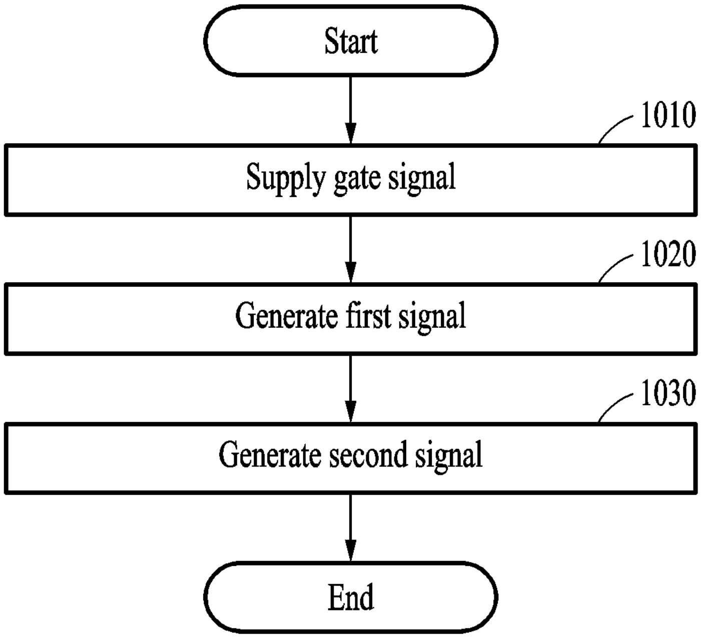
FIG. 10 is a flowchart illustrating an operation of a display driving unit according to an embodiment.

FIG. 10 is a flowchart illustrating an operation of a display driving unit according to an embodiment. FIG. 10 may be a diagram illustrating an operation of a display driving unit in a test mode for detecting an abnormality in a gate driving buffer.

Referring to FIG. 10, according to an embodiment, operations 1010 to 1030 may be performed sequentially, but are not limited thereto. For example, two or more operations may be performed in parallel, or the order of operations may be changed.

In operation 1010, a display driving unit (e.g., the display driving unit 122 of FIG. 1) supplies a gate signal to a gate line (e.g., the gate line GL1 of FIGS. 3 to 6) of a display panel (e.g., the display panel 124 of FIGS. 1 and 2) through at least one of a first gate driving buffer (e.g., the first gate driving buffer 310 of FIGS. 3 to 6) and a second gate driving buffer (e.g., the second gate driving buffer 320 of FIGS. 3 to 6).

In operation 1020, the display driving unit generates a first signal (e.g., the output signal 56 of FIG. 5) for controlling at least one of the first gate driving buffer and the second gate driving buffer based on an output signal of the second gate driving buffer supplied to the gate line through a first comparison circuit (e.g., the first comparison circuit 442 of FIG. 5).

In operation 1030, the display driving unit generate a second signal (e.g., the output signal 66 of FIG. 6) for controlling at least one of the first gate driving buffer and the second gate driving buffer based on an output signal of the first gate driving buffer supplied to the gate line through a second comparison circuit (e.g., the second comparison circuit 444 of FIG. 6).

Figure 11:
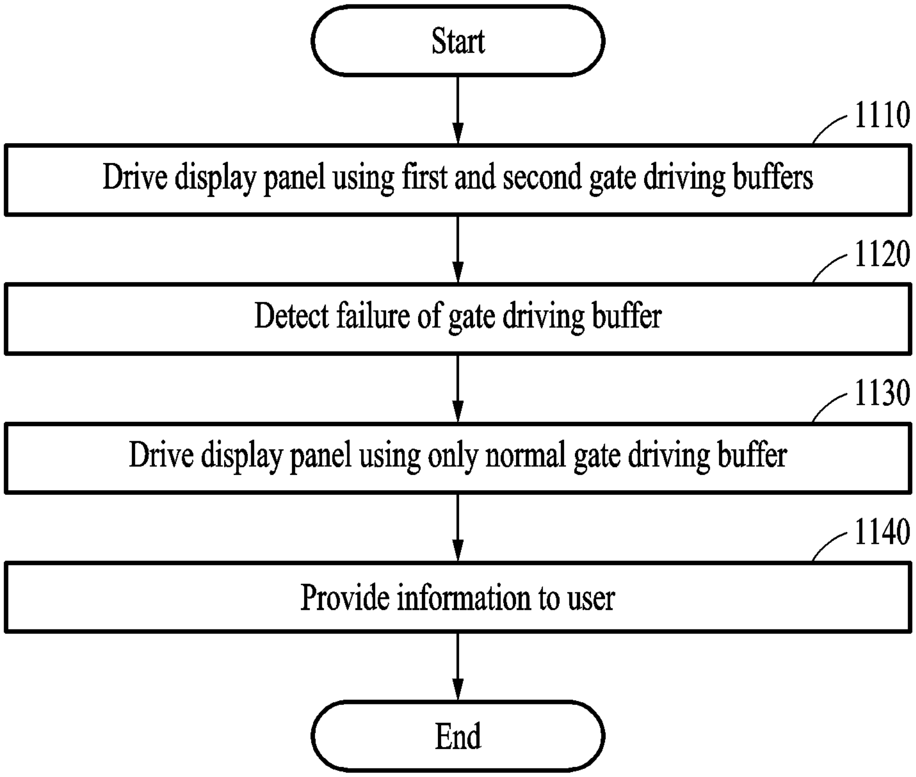
FIG. 11 is a flowchart illustrating an operation of a display driving unit according to an embodiment.

FIG. 11 is a flowchart illustrating an operation of a display driving unit according to an embodiment. FIG. 11 may be a diagram illustrating a method of driving a display panel by a display driving unit when an abnormality in a gate driving buffer is detected through a test mode.

Referring to FIG. 11, according to an embodiment, operations 1110 to 1140 may be performed sequentially, but are not limited thereto. For example, operations 1130 and 1140 may be performed in parallel. Operations 1110 to 1130 may be substantially the same as the operations of the display driving unit described above (e.g., the display driving unit 122 of FIG. 1). Therefore, a repeated description is omitted.

In operation 1110, the display driving unit 122 may supply a gate signal to a gate line (e.g., the gate line GL1 of FIG. 3) of a display panel by using at least one of a first gate driving buffer (e.g., the first gate driving buffer 310 of FIG. 3) and a second gate driving buffer (e.g., the second gate driving buffer 320 of FIG. 3). For example, the display driving unit 122 may supply the gate signal to the gate line GL1 by using both the first gate driving buffer 310 and the second gate driving buffer 320.

In operation 1120, the display driving unit 122 may detect an abnormality in the first gate driving buffer 310 or the second gate driving buffer 320 in the test mode. The display driving unit 122 may enter the test mode based on conditions set by a user. For example, the set condition may be set so that when a current time reaches a set time, the display driving unit 122 operates in the test mode.

In operation 1130, the display driving unit 122 may supply the gate signal to the gate line GL1 of the display panel by using only the gate driving buffer in a normal state, and not the gate driving buffer in which an abnormality is detected.

In operation 1140, the display driving unit 122 may provide information indicating that there is an abnormality in the gate driving buffer to the user.

It should be appreciated that embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C," may include any one of the items listed together in the corresponding one of the phrases, or all possible combinations thereof. Terms such as "1st", "2nd", or "first" or "second" may simply be used to distinguish the component from other components in question, and do not limit the components in other aspects (e.g., importance or order). It is to be understood that if a component (e.g., a first component) is referred to, with or without the term "operatively" or "communicatively", as "coupled with," "coupled to," "connected with," or "connected to" another component (e.g., a second component), the component may be coupled with the other component directly (e.g., by wire), wirelessly, or via a third component.

As used in connection with embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least portion of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The effects according to embodiments are not limited to the above-mentioned effects, and other unmentioned effects may be clearly understood from the description by one of ordinary skill in the art.

What is claimed is:

1. A display driving unit comprising:

a first gate driving buffer configured to supply a first gate signal to a gate line of a display panel;

a second gate driving buffer configured to supply a second gate signal to the gate line;

a first comparison circuit configured to generate a first signal for controlling at least one of the first gate driving buffer and the second gate driving buffer based on an output signal of the second gate driving buffer when a comparison of the output signal of the second gate driving buffer and a first reference signal from the first gate driving buffer indicates that the second gate driving buffer is in an abnormal state; and a second comparison circuit configured to generate a second signal for controlling at least one of the first gate driving buffer and the second gate driving buffer based on an output signal of the first gate driving buffer when a comparison of the output signal of the first gate driving buffer and a second reference signal from the second gate driving buffer indicates that the first gate driving buffer is in an abnormal state.

2. The display driving unit of claim 1, wherein the first gate driving buffer comprises:

first gate driving logic configured to output a driving signal for activating the gate line; and a first level shifter configured to increase a level of an output signal of the first gate driving logic, and the second gate driving buffer comprises:

second gate driving logic configured to output a driving signal for activating the gate line; and a second level shifter configured to increase a level of an output signal of the second gate driving logic.

3. The display driving unit of claim 2, wherein the first gate driving buffer further comprises a first switch for coupling the first level shifter to a first end of the gate line, and the second gate driving buffer further comprises a second switch for coupling the second level shifter to a second end of the gate line.

4. The display driving unit of claim 3, further comprising:

a controller configured to control at least one of the first switch and the second switch based on at least one of an output signal of the first comparison circuit and an output signal of the second comparison circuit.

5. The display driving unit of claim 2, further comprising:

a first internal buffer configured to decrease a level of the output signal of the second gate driving buffer; and a second internal buffer configured to decrease a level of the output signal of the first gate driving buffer.

6. The display driving unit of claim 5, wherein each of the first internal buffer and the second internal buffer comprises at least one inverter connected in series.

7. The display driving unit of claim 5, wherein the first comparison circuit is configured to compare the output signal of the first gate driving logic and an output signal of the first internal buffer while the gate line is activated by the second gate driving buffer.

8. The display driving unit of claim 7, wherein the first comparison circuit is configured to compare an output signal level of the first gate driving logic and an output signal level of the first internal buffer.

9. The display driving unit of claim 5, wherein the second comparison circuit is configured to compare the output signal of the second gate driving logic and an output signal of the second internal buffer while the gate line is activated by the first gate driving buffer.

10. A method of driving a display, the method comprising:

supplying a gate signal to a gate line of a display panel through at least one of a first gate driving buffer and a second gate driving buffer;

generating a first signal for controlling at least one of the first gate driving buffer and the second gate driving buffer based on an output signal of the second gate driving buffer supplied to the gate line, through a first comparison circuit; and generating a second signal for controlling at least one of the first gate driving buffer and the second gate driving buffer based on an output signal of the first gate driving buffer supplied to the gate line, through a second comparison circuit, wherein the first signal is generated by the first comparison circuit when a comparison of the output signal of the second gate driving buffer and a first reference signal from the first gate driving buffer indicates that the second gate driving buffer is in an abnormal state, and wherein the second signal is generated by the second comparison circuit when a comparison of the output signal of the first gate driving buffer and a second reference signal from the second gate driving buffer indicates that the first gate driving buffer is in an abnormal state.

11. The method of claim 10, wherein the generating of the first signal comprises, while the gate line is activated by the second gate driving buffer:

generating a level adjusted signal by adjusting a level of the output signal of the second gate driving buffer; and comparing the level adjusted signal and an output signal of a gate driving logic of the first gate driving buffer.

12. A display device comprising:

a display panel comprising a pixel array including pixels, and a gate line for providing a voltage to a row of the pixels;

a first gate driving buffer configured to supply a first gate signal to the gate line of the display panel;

a second gate driving buffer configured to supply a second gate signal to the gate line;

a first comparison circuit configured to generate a first signal for controlling at least one of the first gate driving buffer and the second gate driving buffer based on an output signal of the second gate driving buffer when a comparison of the output signal of the second gate driving buffer and a first reference signal from the first gate driving buffer indicates that the second gate driving buffer is in an abnormal state; and a second comparison circuit configured to generate a second signal for controlling at least one of the first gate driving buffer and the second gate driving buffer based on an output signal of the first gate driving buffer when a comparison of the output signal of the first gate driving buffer and a second reference signal from the second gate driving buffer indicates that the first gate driving buffer is in an abnormal state.

13. The display device of claim 12, wherein the first gate driving buffer comprises:

first gate driving logic configured to output a driving signal for activating the gate line; and a first level shifter configured to increase a level of an output signal of the first gate driving logic, and the second gate driving buffer comprises:

second gate driving logic configured to output a driving signal for activating the gate line; and a second level shifter configured to increase a level of an output signal of the second gate driving logic.

14. The display device of claim 13, wherein the first gate driving buffer further comprises a first switch for coupling the first level shifter to a first end of the gate line, and the second gate driving buffer further comprises a second switch for coupling the second level shifter to a second end of the gate line.

15. The display device of claim 14, further comprising:

a controller configured to control at least one of the first switch and the second switch based on at least one of an output signal of the first comparison circuit and an output signal of the second comparison circuit.

16. The display device of claim 13, further comprising:

a first internal buffer configured to decrease a level of the output signal of the second gate driving buffer; and a second internal buffer configured to decrease a level of the output signal of the first gate driving buffer.

17. The display device of claim 16, wherein the first comparison circuit is configured to compare the output signal of the first gate driving logic and an output signal of the first internal buffer while the gate line is activated by the second gate driving buffer.

18. The display device of claim 17, wherein the first comparison circuit is configured to compare an output signal level of the first gate driving logic and an output signal level of the first internal buffer.

19. The display device of claim 16, wherein the second comparison circuit is configured to compare the output signal of the second gate driving logic and an output signal of the second internal buffer while the gate line is activated by the first gate driving buffer.

20. The display device of claim 16, wherein each of the first internal buffer and the second internal buffer comprises at least one inverter connected in series.

* * * * *